J. C. HUGHES.
PIPE BUCK.
APPLICATION FILED APR. 5, 1920.
1,400,067.
Patented Dec. 13, 1921.
2 SHEETS—SHEET 1.
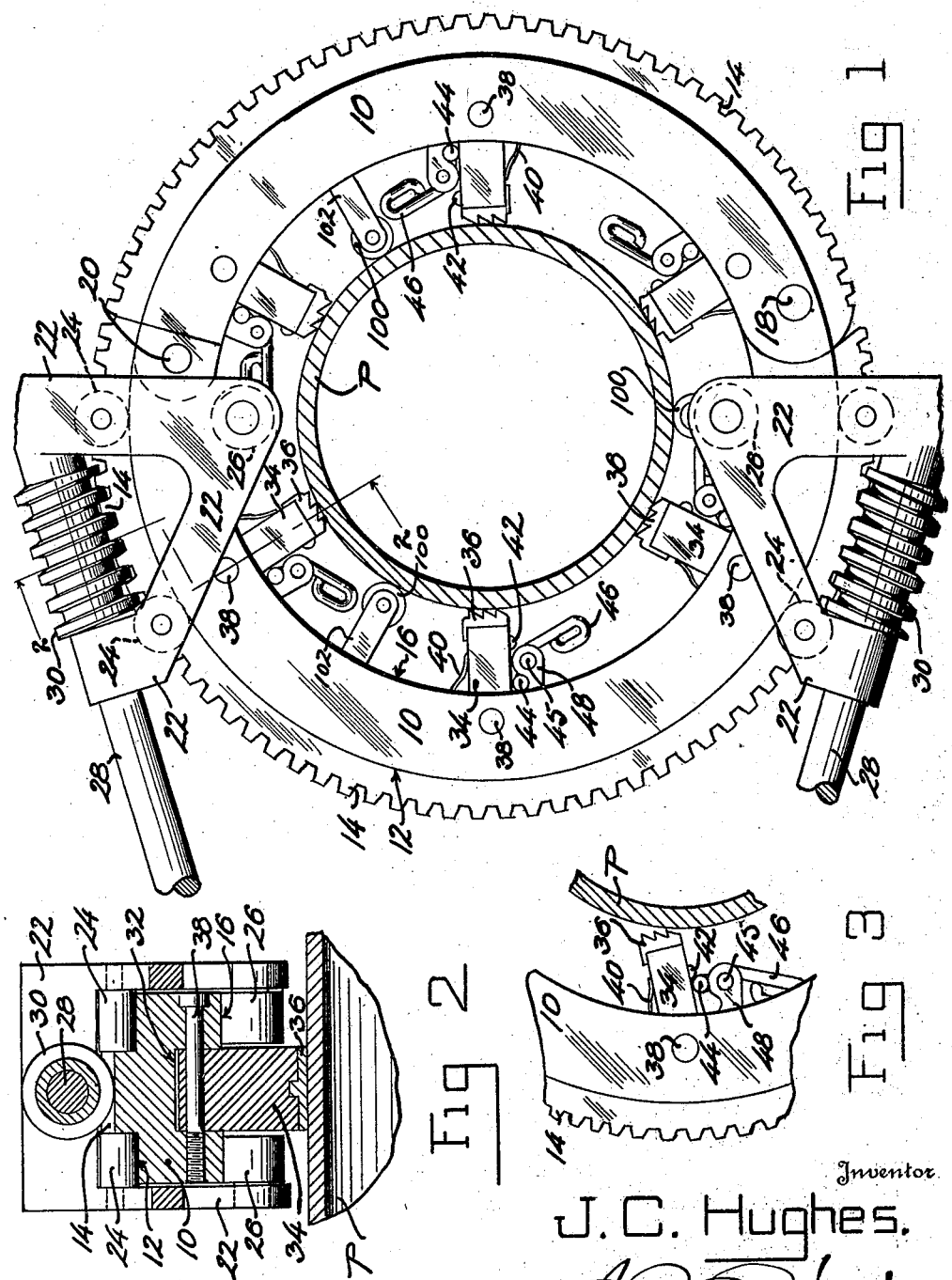
Inventor
J. C. Hughes.
By
Attorney

J. C. HUGHES.
PIPE BUCK.
APPLICATION FILED APR. 5, 1920.

1,400,067.

Patented Dec. 13, 1921.
2 SHEETS—SHEET 2.

Inventor
J. C. Hughes.
By
Attorney

UNITED STATES PATENT OFFICE.

JAMES C. HUGHES, OF FORT MORGAN, COLORADO.

PIPE-BUCK.

1,400,067. Specification of Letters Patent. Patented Dec. 13, 1921.

Application filed April 5, 1920. Serial No. 371,410.

*To all whom it may concern:*

Be it known that I, JAMES C. HUGHES, a citizen of the United States, residing at Fort Morgan, county of Morgan and State of Colorado, have invented certain new and useful Improvements in Pipe-Bucks; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide an efficient structure for turning pipes of large diameters into their fittings, this particular type being known as pipe bucks. It is also an object of the invention to provide such a structure which may be easily operated, and which may be used in close quarters.

Briefly, the invention comprises an outer ring, composed of two hinged members, said ring being provided with gearing on its circumference adapted to be engaged and driven by worm gears. Brackets are carried by the ring, and rollers adapted to travel upon inner and outer tracks formed on the ring member. The inner part of the ring member is provided with a series of gripping jaws pivoted to the ring and adapted to bite into the pipe when it is turned. Devices are also provided for holding these gripping members out of engagement with the pipe when desired.

In the drawings:

Figure 1 shows the device applied to a pipe, the latter appearing in section.

Fig. 2 is a sectional detail on line 2—2 of Fig. 1.

Fig. 3 is an elevational detail, showing the pipe-engaging means held in inoperative position.

Figure 4:
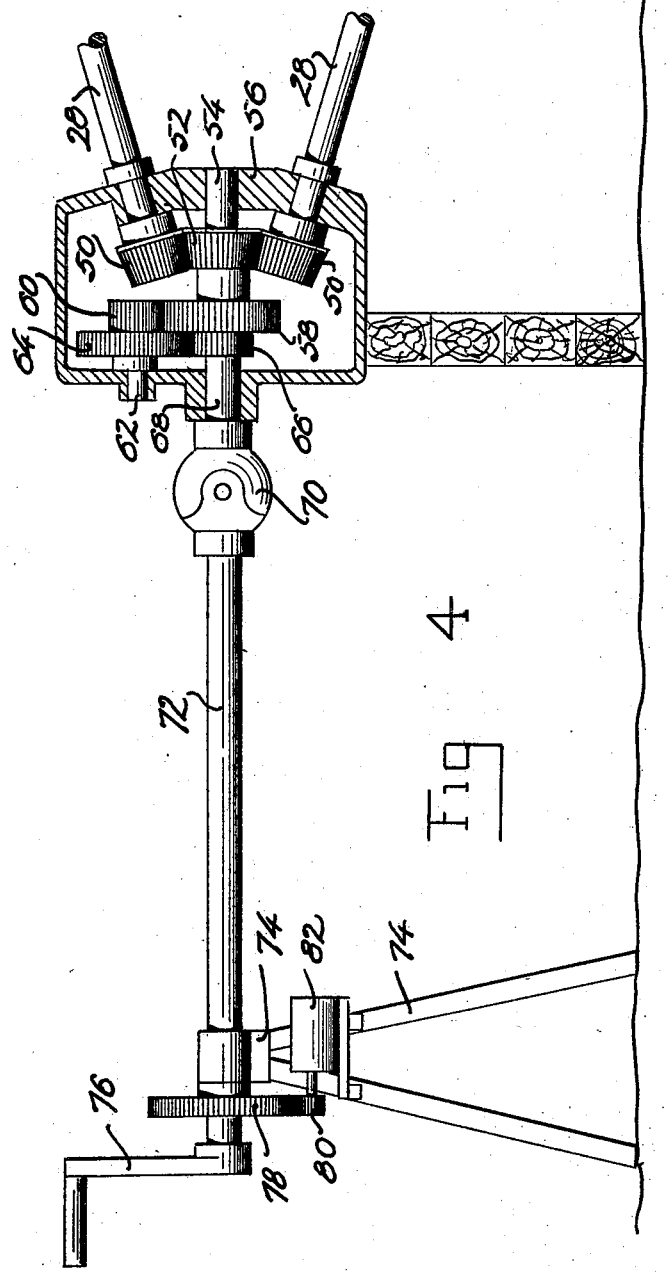
Fig. 4 is a view partly in elevation and partly in section, showing means for driving the device.

A pipe P is shown in connection with which the buck is to be used. The buck comprises a heavy ring member 10, in two parts, which are pivoted together at 18 and detachably held together at 20. The parts are provided with gear teeth 14 on the circumference and with outer tracks 12 and inner tracks 16, produced by laterally disposed annular shoulders. A bracket 22 is mounted upon each side of the ring member 10, and each bracket carries a pair of rollers 24 traveling upon the track 12, and an inner roller 26 traveling upon the track 16. By this construction the rollers 24 and 26 retain the brackets 22 upon the ring member. The brackets also carry journals for shafts 28, provided with worm gears 30, which mesh in the circumferential gearing 14. The inner face of the ring member 10 is channeled as indicated at 32 (Fig. 2), and has mounted therein the inner ends of jaws 34 which are provided with renewable toothed blocks 36, adapted to engage the pipe. These jaws 34 are pivoted upon bolts 38 mounted in the ring member 10.

In order to retain the jaws 34 normally in engagement with the pipe P, springs 40 are provided for the purpose of pressing the said jaws into such engagement. It is necessary, however, to hold said jaws out of engagement when placing the device upon a pipe. For this purpose the opposite sides of the jaws are provided with any sort of detents 42, adapted to hold and serve as stops for latch members 44, pivoted at 45 in supports 48 on the ring member 10, and operable by handle portions 46.

Guide rollers 100 are provided at spaced intervals, these rollers being mounted upon fixed supports 102 on the ring member 10.

For the purpose of driving the mechanism, the worm gear shafts 28 are provided on their outer ends with bevel gears 50, meshing with a bevel gear 52 on a stub shaft 54, carried in a housing 56. The stub shaft 54 also carries a large gear 58, which meshes with a small gear 60 on a stub shaft 62, also mounted in the housing 56 and carrying a larger gear 64. The gear 64 meshes with a small gear 66 on a shaft 68 journaled in the housing 56 and connected with a universal joint 70, on a main drive shaft 72. The outer end of the shaft 72 may be mounted upon any suitable support 74 and may be driven either by a hand crank 76 or by a driven gear 78, meshing with a pinion 80 receiving power from a motor 82. The gears 78 and 80 may be thrown into or out of mesh by any suitable mechanism, as required.

From the foregoing, it will be seen that means is provided for suitably gearing down to drive the ring 10 at the slow speed required. It will also be seen that by the use of the universal joint 70 the main drive shaft 72 may be twisted around at an angle to the shafts 28, so that the devices may be used in close quarters, as is frequently required.

In using this invention, the ends of the members of the ring 10 are released at 20 and thrown back on the hinge 18, the jaws 34 being held in inoperative position by means of the latches 44. The device is then mounted upon the pipe, which is properly positioned by means of the rollers 100. The parts of the ring 10 are then drawn together and secured at 20. The latches 44 are then released by means of the levers 46, allowing the teeth 36 to come in contact with the pipe. Power is then applied to drive the gearing 14 through the medium of the worms 30. This causes the teeth 36 to bite into the pipe, swinging slightly about the pivots 38 of the jaws 34. This is continued until the pipe is turned as far as desired. The power is then reversed for a moment in order to allow the teeth 36 to be pulled out of their firm engagement with the pipe. This is necessary in order that the jaws 34 may be thrown out of engagement manually by the levers 46 into position as shown in Fig. 3.

If desired, the main drive shaft 72 may be extensible in order to set the driving mechanism mounted on support 74 at a distance from the housing 56. It will also be necessary to provide some means, such as the blocking shown in Fig. 4, to support the housing 56 and take up the strain during operation. It will be understood that such other bracing parts may be employed as conditions may demand.

It will be understood, of course, that I do not wish to be limited to the specific form disclosed in the accompanying drawing, since many changes may be made in construction without departing from the invention as covered in the claims appended hereto.

I claim:

1. A pipe buck comprising a ring member adapted to be positioned about a pipe, devices on said member to engage the pipe during the turning operation, gear teeth formed on said ring member, worm gears engaging in said teeth at spaced points for turning the member converging shafts on which said worm gears are mounted, and a single drive shaft geared to said converging shafts.

2. A pipe buck comprising a ring member, movable means within said member to engage a pipe for turning the same, brackets mounted upon said ring member carrying inner and outer rollers traveling upon inner and outer tracks on said ring member, said ring member having gear teeth thereon, and gear mechanism carried by said brackets and engaging said teeth for driving the ring member.

3. A pipe buck comprising a rigid ring member, jaws within said member and pivoted thereto, said jaws having teeth to engage a pipe for turning the same, means to engage and swing said jaws and hold them out of engaging position when the ring member is being applied, and means to turn said member.

4. A pipe buck comprising a ring member adapted to be positioned about a pipe, devices on said member to engage the pipe during the turning operation, gear teeth formed on said ring member, worm gears engaging in said teeth at spaced points for turning the member, shafts upon which said worm gears are mounted, a drive shaft geared to said shafts, and a flexible connection in said drive shaft.

5. A pipe buck comprising a ring member, movable means within said member to engage a pipe for turning the same, brackets mounted upon the ring, rollers in said brackets to engage inner and outer tracks on the ring member and thereby retain the brackets on the ring member, and means carried by the brackets for engaging and driving said ring member.

6. A pipe buck comprising a ring member, pivoted jaws within said member having teeth to engage a pipe for turning the same, means to engage and swing said jaws and hold them out of engaging position when the ring member is being applied, means to turn said member, said ring member being formed in two parts pivoted together, each part carrying certain of said jaws, and means for securing the parts together during operation.

In testimony whereof I affix my signature.

JAMES C. HUGHES.